(12) United States Patent
Degnan

(10) Patent No.: US 7,457,730 B2
(45) Date of Patent: Nov. 25, 2008

(54) METHOD AND SYSTEM FOR VIRTUAL DECORATION

(76) Inventor: Donald A. Degnan, 1319 Pine St., Boulder, CO (US) 80302

( * ) Notice: Subject to any disclaimer, the term of this patent is extended or adjusted under 35 U.S.C. 154(b) by 207 days.

(21) Appl. No.: 11/306,091

(22) Filed: Dec. 15, 2005

(65) Prior Publication Data

US 2007/0143082 A1 Jun. 21, 2007

(51) Int. Cl.
*G06F 17/50* (2006.01)
(52) U.S. Cl. .................. 703/1; 52/36.1; 52/235
(58) Field of Classification Search .............. 703/1; 52/235, 36.1; 345/419; 382/100; 248/542; 446/479

See application file for complete search history.

(56) References Cited

U.S. PATENT DOCUMENTS

| | | | | |
|---|---|---|---|---|
| 4,457,485 | A * | 7/1984 | Landt | 248/542 |
| 6,912,293 | B1 * | 6/2005 | Korobkin | 382/100 |
| 2002/0177982 | A1 * | 11/2002 | Boulouednine et al. | 703/1 |
| 2003/0043144 | A1 * | 3/2003 | Pundarika et al. | 345/419 |
| 2004/0176932 | A1 * | 9/2004 | Foster et al. | 703/1 |
| 2006/0080901 | A1 * | 4/2006 | Wagner et al. | 52/36.1 |
| 2006/0101742 | A1 * | 5/2006 | Scott-Leikach et al. | 52/235 |

OTHER PUBLICATIONS

Coyne et al., B. WordsEye: An Automatic Text-to-Scene Conversion System, Proceedings of the 28th Annual Conf. on Computer Graphics and Interactive Techniques, Aug. 2001, pp. 487-496.*
Shiaw et al., H. The 3D Vase Museum: A New Approach to Context in a Digital Library, Proceedings of the 4th ACM/IEEE-CS Joiont Conference on Digital Libraries, Jun. 2004, pp. 125-134.*
Redstrom et al., J. Informative Art: Using Amplified Artworks as Information Displays, Proceedings of the DARE 2000 on Designing Augmented Reality Environments, Apr. 2000, pp. 103-114.*

* cited by examiner

*Primary Examiner*—Russell Frejd
(74) *Attorney, Agent, or Firm*—Holland & Hart LLP

(57) ABSTRACT

Systems and methods for facilitating the decoration of an area, and particularly a surface such as a wall in a room, are provided. A user may view a virtual impression of the placement of selected artwork on a particular wall. The user provides an image of the area to be decorated, along with a reference scale associated with the area, to a server. The user views and selects an image of an artwork object from an available selection of artwork images, the artwork image having a corresponding size of the artwork object. The image of the artwork is scaled such that the ratio of the size of the artwork object and the size of the artwork image substantially corresponds to the ratio of the size of the area to be decorated and the size of the area image. The scaled artwork image is then overlayed on the area image and may be viewed by the user to provide a simulated image of the area and artwork.

17 Claims, 10 Drawing Sheets

METHOD AND SYSTEM FOR VIRTUAL DECORATION

FIELD OF THE INVENTION

The present invention relates to techniques for decorating an area interactively, and more specifically to methods and systems of previewing, placing and purchasing artwork and other items to be hung, placed or positioned on a wall.

BACKGROUND OF THE INVENTION

The selection and placement of art, decorations, shelves, sconces, or other objects on or about a wall or area to be decorated is a highly subjective task that depends upon numerous factors. Some of these factors include the size of the area to be decorated and the placement, size, colors and style of objects adjacent to or already placed on the wall to be decorated, such as windows, doors, window coverings, furnishings and light fixtures. Often, it is a combination of many, or all, of these factors, filtered through the subjective eyes of a decision maker, that determines what piece(s) of artwork are placed in an area to be decorated.

People commonly choose artwork based upon their own tastes, or receive assistance and advice from others in choosing artwork. However, the selection of artwork is influenced by many factors beyond choosing an artist or style. For example, the lighting in the room, the surrounding colors of the walls, ceilings, flooring, the type of window coverings, the style of furnishings and other objects in the room and other factors will influence the appearance of the artwork once it is placed. Most artwork is selected in an environment, such as a gallery, that is unlike the wall and room upon which it will be ultimately placed. These environments tend to be sterile, with the focus on the artwork uninfluenced by other environmental factors that are typical of a residence, office, commercial, or industrial location that is to be decorated.

Thus, the selection of artwork traditionally has been on a "hit or miss" approach. Artwork is selected, placed upon a wall and then returned if its size and/or style does not have the desired impression. This can become a time-extensive and often frustrating project when several pieces are tried. Such a process may also become relatively expensive in the event that artwork has to be shipped or otherwise picked up and/or delivered to the location and back to the source. Many art galleries are located in tourist destinations or other locations remote to the location the purchaser will actually hang the artwork, further exacerbating this problem. The inability for the potential purchaser of artwork to determine whether a selected piece of artwork will fit or look desirable once hung on a wall within the potential purchaser's home, office or other space is a significant impediment to selecting and purchasing artwork.

Another problem with the selection of the artwork is the relative inability to access a broad selection of pieces of artwork. Presently, a significant amount of artwork is purchased through galleries or shops. Thus, in order for an individual to view various pieces of artwork, a personal visit to each of the galleries having the artwork is generally required. This simply is not feasible due to time and travel constraints, so the amount of artwork that is available to a typical individual is limited to the artwork that is available in the areas that the individual resides or happens to be traveling. While it is possible to view books of art to see additional artwork, or even visit websites of available artwork, the artwork available through these avenues is limited and they do not lend themselves to visually inspecting the artwork in a desired environment.

Similarly, shops and/or galleries that provide artwork generally have clientele that is limited to local area residents and visitors to the area that happen to stop at the shop or gallery. However, even if a visitor to the area stops at the shop or gallery, they are often hesitant to purchase a piece due to the considerations described above. Thus, shops or galleries that sell pieces of artwork often have a market that is much smaller than the total market of potential buyers of such pieces of artwork. Individual artists have similarly limited access to potential purchasers of their artwork. Their clientele is generally limited to those who are aware of the artist and her work or has access to and knowledge of the artist's work through galleries, shops or internet sites that feature her art.

As a result, significant inefficiencies exist in pairing suitable artwork, on the one hand, with individuals who are seeking artwork, suitable for a particular location or otherwise, on the other hand.

SUMMARY OF THE INVENTION

The present invention involves simulating the appearance of one or more artwork items in a wall area to be decorated. In order to provide an accurate simulation, the size of the wall area to be decorated, and the size of a wall area image of the wall area to be decorated, are determined. An image of an artwork item is selected, and the size of the artwork item and the size of the artwork image are determined. A ratio of the size of the wall area to be decorated and the size of the wall area image is determined, along with a ratio of the size of the artwork item and the size of the artwork image. One or both of the wall area image and artwork image is scaled such that the ratios are substantially equal, thereby providing a relatively accurate simulation of the selected artwork item in the area to be decorated.

In one embodiment, the present invention provides a method for providing a simulation of an area to be decorated with at least one artwork item, the area to be decorated having an area dimension. The method of this embodiment comprises receiving a wall area image of the area to be decorated, the wall area image having a wall area image dimension, and calculating a wall area image scaling factor proportional to the area dimension and to the wall area image dimension. An artwork image of an artwork item is provided, the artwork item having an artwork item dimension and the artwork image having an artwork image dimension. An artwork image scaling factor is calculated that is proportional to the artwork item dimension and the artwork image dimension. The wall area image and/or the artwork image are resized such that the wall area image scaling factor and the artwork image scaling factor are substantially equal. Then, the artwork image and the wall area image are displayed to provide a combined image simulating the artwork item in the area to be decorated. The resizing may include scaling the artwork image such that the artwork image scaling factor and the wall area image scaling factor are substantially equal, and the scaled artwork image then placed proximate the wall area image. The artwork image may also be moved within the wall area image to provide a simulation of the artwork item in different locations within the area to be decorated. Furthermore, two or more artwork images may be scaled and placed proximate the wall area image to provide a simulation of the two or more artwork items within the area to be decorated.

In another embodiment, the present invention provides a system for viewing a simulation of at least one artwork item in an area to be decorated having an area dimension. The system of one embodiment comprises a display module configured to scale an artwork image of the artwork item based on the area dimension, the display module further configured to create an overlayed image by overlapping the scaled artwork image on a wall area image of the area to be decorated. A user interface module is configured to receive the wall area image and the area dimension, the user interface module further configured to display the overlayed image. A décor query module is configured to receive a décor search criteria from the user interface module. The décor search criteria may include a number of criteria associated with an artwork image and the artwork item associated with the artwork image, such as size, style, subject, artist, color, and/or cost. A storage module is configured to provide at least one artwork image of the artwork item to the display module according to the search criteria. The display module, in one embodiment, comprises a scale calculation module operable to receive a wall area image dimension and the area dimension associated with the wall area image, receive an artwork image dimension and an artwork dimension associated with the artwork image, and calculate a resizing factor that, when applied to the artwork image, provides a resized artwork image that is scaled according to the wall area image.

In still another embodiment, the invention provides a method for transporting an image of an artwork item in an area to be decorated towards an interested entity. The method comprises conveying, over a portion of a computer network, an artwork image of the artwork item that includes a plurality of pixels. The plurality of pixels include a first subset of pixels corresponding to an artwork image, and a second subset of pixels corresponding to a wall area image of the area to be decorated. The first subset of pixels are determined based on the artwork image and a scaling factor of the artwork image relative to a scaling factor of the wall area image. The first subset of pixels may include pixels corresponding to two or more artwork images.

Yet another embodiment of the invention provides a computer readable medium having instructions encoded thereon that, when executed by a computing device, cause the computing device to perform operations comprising: (a) accessing a wall area image of an area to be decorated, the wall area image having a wall area image scaling factor based on a dimension of the area to be decorated; (b) accessing an artwork image of an artwork item, the artwork image having an artwork image scaling factor based on a dimension of the artwork item; (c) resizing the wall area image and/or the artwork image such that the wall area image scaling factor and the artwork image scaling factor are substantially equal; and (d) displaying the artwork image and the wall area image to provide a combined image simulating the artwork item in the area to be decorated. The operations may further comprise (e) accessing a second artwork image of a second artwork item, the second artwork image having a second artwork image scaling factor based on a dimension of the second artwork item; (f) resizing the second artwork image such that the second artwork image scaling factor and the wall area image scaling factor are substantially equal; and (g) displaying the artwork image, the second artwork image, and the wall area image to provide a combined image simulating the artwork items in the area to be decorated. The wall area image scaling factor may be based on a reference mark contained in the wall area image.

In a further embodiment of the invention a user may post one or more wall area images of wall areas to be decorated to a décor service location. One or more providers of artwork items, such as designers, artists, gallery owners and others, provide suggested artwork images of artwork items for the area to be decorated. Artwork providers overlay their suggested artwork images on the wall area image(s), with the artwork image(s) and/or wall area image(s) scaled to provide an accurate simulation of the artwork item in the area to be decorated. The overlayed image(s) is then provided to the user, who may then select one or more artwork items from the suggested artwork image(s). The overlayed image(s) may be sent to the user using any appropriate means, such as electronic transmission to the user, hard copy delivery to the user, and/or interactively through a website associated with the décor service location, for example.

DETAILED DESCRIPTION

Figure 1:
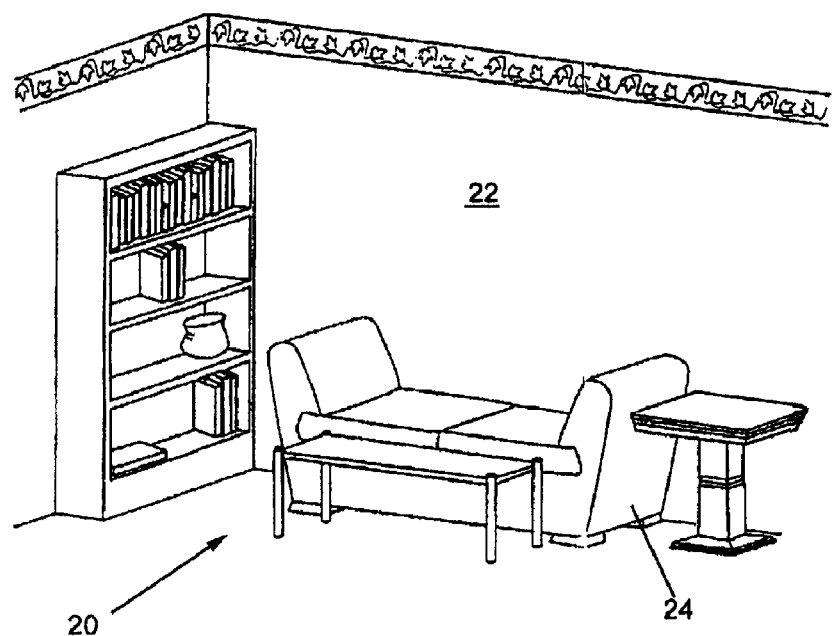
FIG. 1 is an illustration of a portion of an area to be decorated.

The present invention provides systems and methods for facilitating the decoration of an area, and particularly a surface, such as a wall in a room. In one embodiment, a system is provided that allows a user to view a simulation of the placement of selected artwork on a particular wall. It is to be expressly understood that the exemplary embodiments discussed herein are provided for descriptive purposes and are not meant to limit the scope of the claimed inventions. Other embodiments are considered to be within the inventive scope.

For example, a system of one embodiment of the present invention would assist a user in decorating his or her home, workplace, and/or other wall with artwork. This embodiment allows the user to view images of various types of artwork together with an image of the wall that is to be decorated. It is noted that the term "artwork" is given an expansive definition that refers to any items that may be placed on or in proximity to a wall for purposes of decorating a room and/or other area in which decoration is desired. Such items may include, but are not limited to, paintings, prints, photographs, tapestries, rugs, window coverings, drapes, mirrors, candle holders, shelves, sconces, lighting fixtures, clocks, flat panel screens for the display of images, white boards, chalk boards, and/or other objects used to decorate an area, including any frames, matting, and/or displays associated with the items. This helps a user to find artwork that is compatible with the size of the wall area to be decorated and the current décor, for example, of the user's apartment wall. Moreover, other embodiments of the present invention are able to operate over a computer network to allow a user to browse through online art galleries and view a combined image of the wall area to be decorated and one or more artwork pieces. Further embodiments of the present invention allow a user to post or submit wall area images of wall areas to be decorated so that designers, artists, gallery owners and others can access the wall area image and provide suggested artwork images of artwork items for the area to be decorated. Once the artwork is selected, the user may then purchase the artwork. Such a purchase may be made with added confidence that the particular artwork piece that is purchased will be a dimensionally good fit for the wall area to be decorated and produce the aesthetic effect that the user desires.

One embodiment of the present invention is illustrated in FIGS. 1-7. The user, in this example, desires to decorate wall 22 in a room 20, partially illustrated in FIG. 1. The room 20 may be a location in a home, business, or any other location where decoration is desired. Moreover, the room 20 may be an indoor space, an outdoor space, or a combination of an indoor and outdoor space. The room 20 typically includes a number of elements that contribute to the décor or interior design of the room 20. For example, the walls of room 20 may be painted, textured, wallpapered, and/or stenciled. Different colors and motifs may be utilized to set a mood for the room 20. In addition, furniture 24 of a particular style, color, or other visual features may help establish the area's décor. The room 20 may also contain windows, doors, fireplaces, and/or other fixtures that influence the area décor. Furthermore, floor rugs, existing artwork, and existing window coverings may also influence the area's décor. Also, lighting from artificial and/or natural light sources may play an important factor in the selection of artwork. Although highly subjective, a user purchasing artwork often attempts to complement a room's décor with the artwork. Thus, as discussed in more detail below, various embodiments of the present invention help the user select artwork that is of the desired size for the area and that is compatible with the room's existing décor according to the user's individual tastes and preferences.

Figure 2:
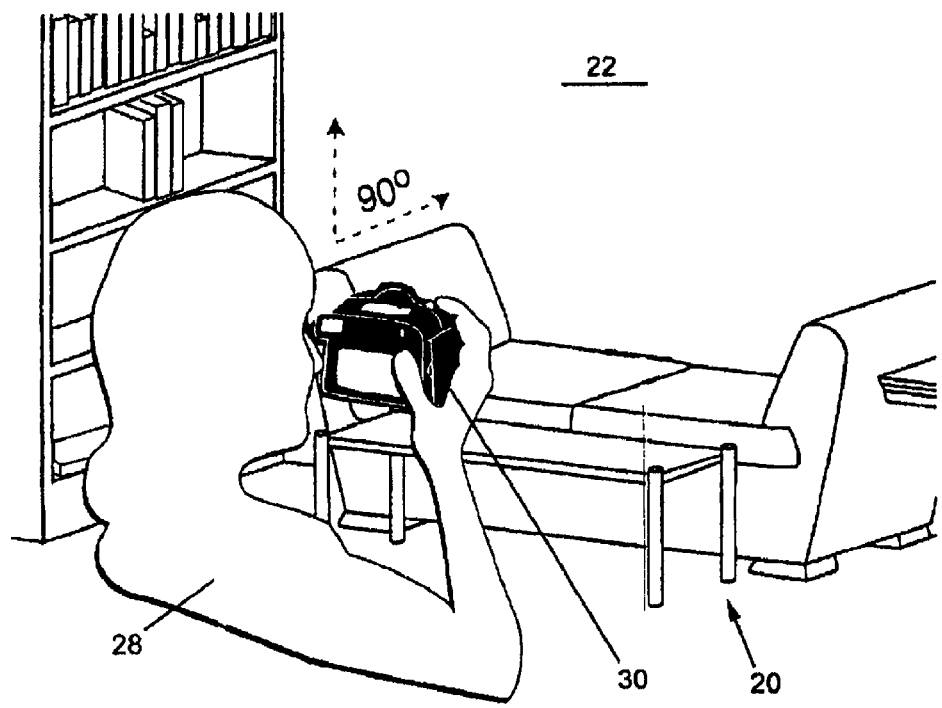
FIG. 2 is an illustration of a user capturing a wall area image of the area to be decorated.
Figure 3:
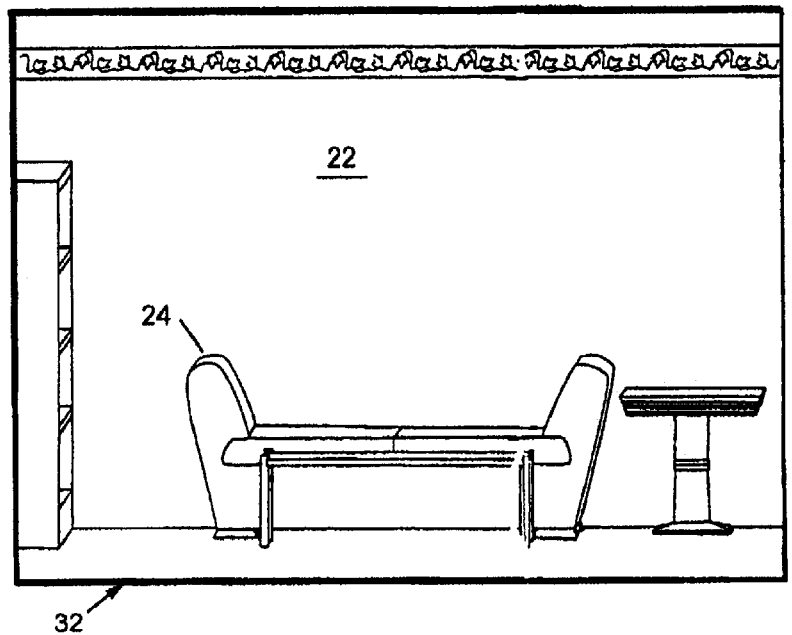
FIG. 3 is an illustration of a wall area image of an area to be decorated.

According to this embodiment, as illustrated in FIG. 2, a user 28 captures an image, referred to as a "wall area image," of the wall area to be decorated 22. An example of a wall area image 32 of an embodiment is illustrated in FIG. 3. Referring still to FIG. 2, a camera 30, or other imaging device, is pointed at about a 90 degree angle with respect to the wall area to be decorated 22, so the wall area image 32 generated by the camera 30 is substantially parallel to the plane of the wall area to be decorated 22. In this embodiment, the wall area image 32 is primarily of the wall area to be decorated 22, although the wall area image 32 may also include portions of adjacent walls, the ceiling, and/or the floor, in order to obtain their environmental influences. Also, the wall area image 32 may include other adjacent objects, such as furniture and/or other artwork that may provide further environmental influences. In one embodiment, a scale reference such as a ruler, or other object, having known dimensions is used to maintain the proper aspect ratio, as discussed in more detail below. Alternatively, one or more scale reference marks may be marked on the wall and used to maintain the proper aspect ratio. Scale reference marks will be described in more detail below. The camera 30 may be a conventional film camera or a digital camera. It is also contemplated that other known imaging devices, such as a video camera, or pantographic cameras may be used. Other technologies that presently exist or that may later be developed that are capable of capturing the wall area image 32 may also be used.

As mentioned above, FIG. 3 is an illustration of a wall area image 32 of an embodiment. The wall area image 32 of this embodiment is taken such that a wall area to be decorated 22 is viewed in a head-on perspective, including the location where it is contemplated that artwork will be mounted. In addition, the wall area image 32 is captured such that it is not substantially tilted in any direction. Thus, the resulting wall area image 32 is captured so as to be substantially level with respect to the wall area to be decorated 22. However, it is to be understood that such wall area images 32 may, in other embodiments, be captured at angles that are substantially different than 90 degrees and/or tilted in a particular direction. In such embodiments, images may be modified to display the wall area to be decorated 22 in the desired orientation. For example, well known imaging editing programs may be used to modify an image. Furthermore, the scale reference may include features that may be used to maintain the proper aspect ratio, as will be discussed in more detail below.

Figure 4:
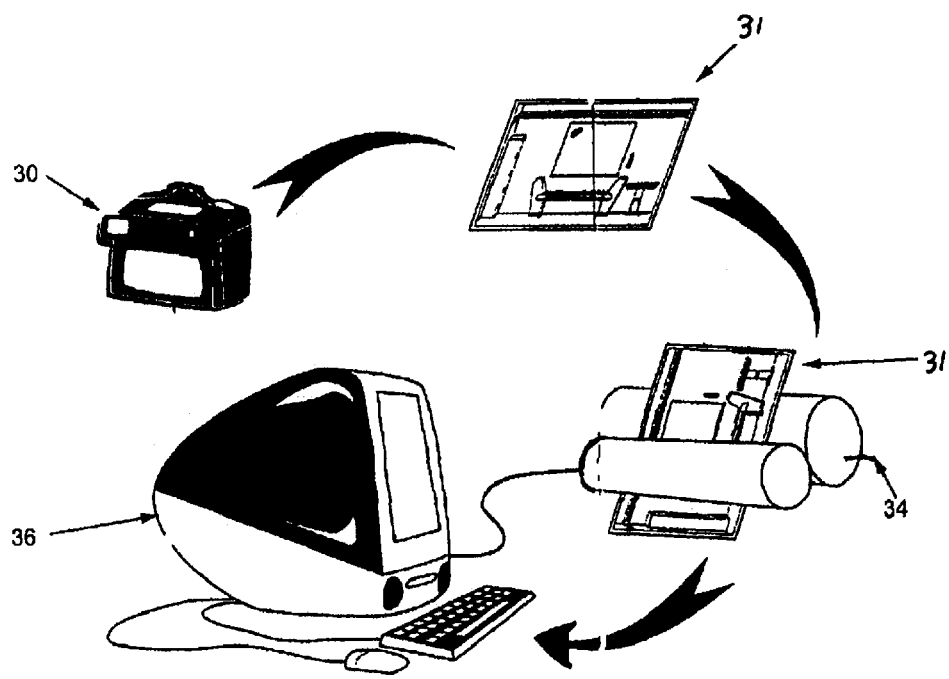
FIGS. 4 and 5 are illustrations of capturing the wall area image digitally and transferring the digital image to a computer.

The wall area image 32 is loaded and stored in a computer in a digital format. In the embodiment of FIG. 4, a film-based camera 30 is used to photograph the wall area to be decorated 22. The resulting photograph 31 is developed and digitally scanned using an optical scanner 34 to create the wall area image 32. While an optical scanner 34 is illustrated in FIG. 4, it will be understood that any suitable image capture system may be utilized to create the wall area image 32. The optical scanner 34 is coupled to a computer 36 that receives the digitized image from the scanner 34. The digitized image is then stored in the computer 36 as the wall area image 32. The wall area image 32 may be stored in any image data format, such as a JPEG or a GIF format, other known image formats, or new image formats developed in the future.

Figure 5:
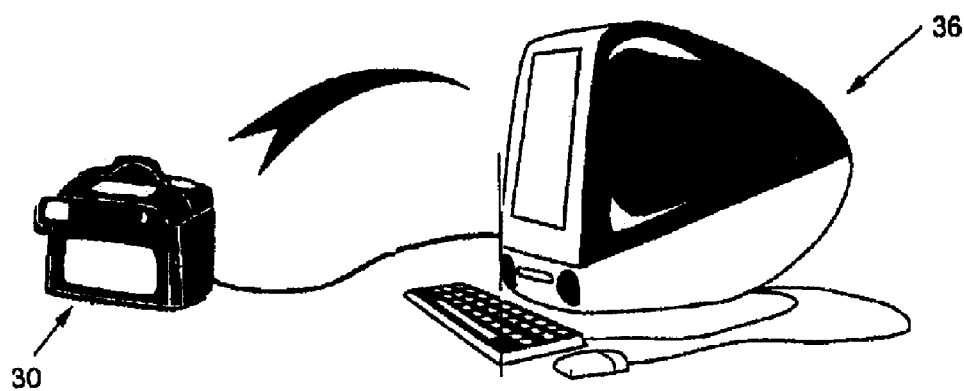

In FIG. 5, a digital camera 30 is shown coupled to the computer 36. Because images produced by the digital camera 30 are already in electronic form, it is not necessary to scan or otherwise digitally capture such an image. The digital image of the wall area to be decorated 22 that is captured by digital camera 30 is transferred to the computer 36 by a cable connection 40, floppy disk, memory card, wireless connection, or other data transferring means. The present invention may also utilize a video camera (not shown), or other device equipped to capture still and/or video images in place of camera 30.

It is contemplated that the wall area image 32 may be edited on the computer 36 to improve the quality of the image. For example, image editing programs such as Adobe Photoshop, Corel Photo-Paint, or Picassa may be used to adjust the contrast, color, brightness, and/or other properties of the wall area image 32 according to the user's preference. Adobe Photoshop, Corel Photo-Paint, and Picassa are trademarks of their respective owners. The wall area image 32 may also be cropped and/or rotated to adjust any misalignments of the camera 30 or optical scanner 34. The wall area image 32 may also be straightened to correct for tilting of the camera 30 during the image capture.

In one embodiment, a color matching system is also incorporated, either through one of the aforementioned image-editing systems, or at a later step in the system. The color matching system, as readily available from a number of commercial sources, including Adobe, Kodak, and others. Such systems, typically use profiles defined by the International Color Consortium (ICC) to ensure that colors are faithfully depicted between devices. For example, it is generally desired that the colors of the wall area image are faithfully depicted on a monitor screen or other viewing device.

Figure 6:
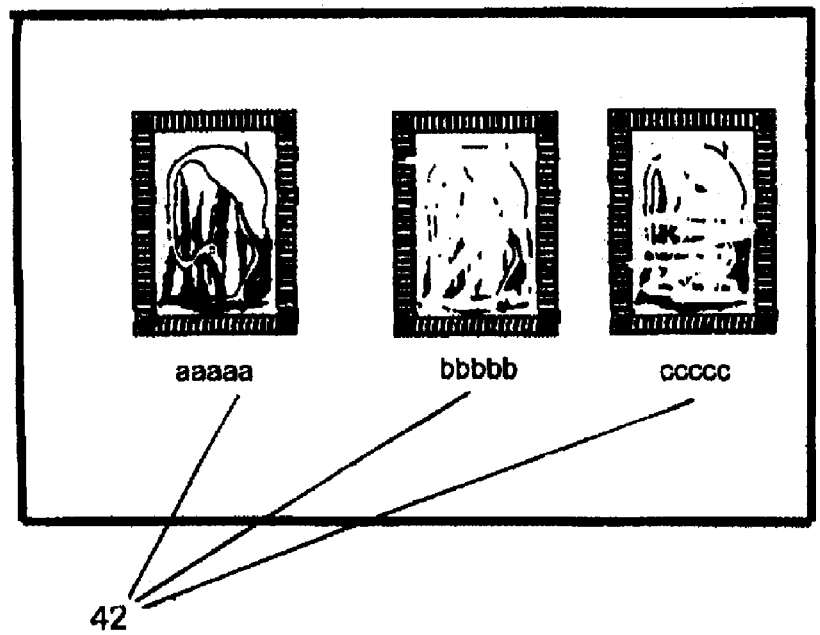
FIG. 6 is an illustration of artwork images.

Similarly as done with the capture of the wall area image, an image of each of the artwork items available for viewing is also captured, referred to as an artwork image 42, as illustrated in FIG. 6. The artwork images 42 may be captured in any available manner by a party that will be providing artwork images 42 for the various embodiments of the invention. Similarly as described above with respect to the capture of the wall area image, a camera or other imaging device is pointed at about a 90 degree angle with respect to the artwork item, so the artwork image 42 generated by the image capture device is substantially parallel to the plane of the artwork item. The artwork image is primarily of the artwork item, although the image capture device may also capture portions of adjacent walls, the ceiling, and/or the floor when the artwork image is captured. For example, an artwork image may be captured using a digital camera with the artwork image comprising a substantial portion of the field of view of the camera. However, due to differences in the aspect ratio of an artwork item and the digital camera, the artwork is not able to encompass the entire field of view of the digital camera in many cases. Furthermore, in cases where the artwork could encompass the entire field of view of the camera, often the image captured will include portions of adjacent surfaces because of difficulties in positioning the camera such that the artwork completely occupies the field of view of the camera. In any event, it is contemplated that the initial captured artwork image will commonly include portions of areas adjacent to the artwork item when the image is captured. In one embodiment, the captured image is cropped using digital image editing programs such as the above-mentioned Adobe Photoshop, Corel Photo-Paint, or Picassa. As is well understood in the art, such editing programs have editing tools that allow a user to crop images such that only the artwork item of interest is included in the artwork image. The area of the image may be selected to include only the image of the artwork item using, for example, a select tool, crop tool, the Photoshop Magic Wand or Lasso tool, and/or similar tools that are available in such image editing programs that are used to select a subset of an image. Thus, the image is edited and/or cropped to include the artwork item. Such editing programs may also be used to adjust the contrast, color, brightness, and/or other properties of the artwork image 42 according to the user's preference. The artwork image 42 may also be rotated to adjust any misalignments of the image capture device and/or straightened to correct for tilting of the image capture device.

The dimensions of the artwork item, referred to as artwork item dimensions, are also noted, so that an artwork image scaling factor may be determined that is based on the artwork item dimensions and the artwork image dimensions. For example, if an artwork item has dimensions of 24 by 36 inches, and the artwork image is 960 by 1,440 pixels, the artwork image scaling factor may be determined to be 40 pixels per inch. In one embodiment, a scale reference such as a ruler, or other object, having known dimensions is used to determine the artwork image scaling factor. For example, a relatively inconspicuous scale reference mark may be adhered to a portion of the artwork item or to an area adjacent to the artwork item that is captured when the artwork image 42 is captured. The scale reference mark may include a distinctive pattern and/or color(s) that may be easily recognized by a user or pattern recognition software. Because the scale reference mark has known dimensions, the artwork image scaling factor may be readily determined. For example, if a scale reference mark is circular and has a diameter of 0.5 inches and the scale reference mark in the artwork image has a diameter of 20 pixels, the artwork image scaling factor may be determined to be 40 pixels per inch.

Figure 7A:
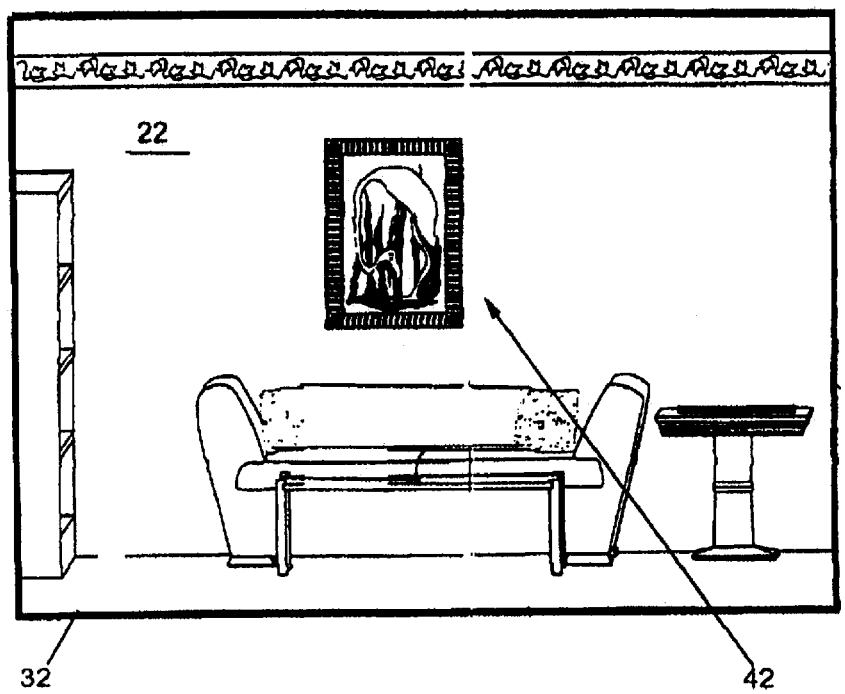
FIG. 7 is an illustration of an overlayed image having an artwork image in combination with a wall area image.
Figure 7B:
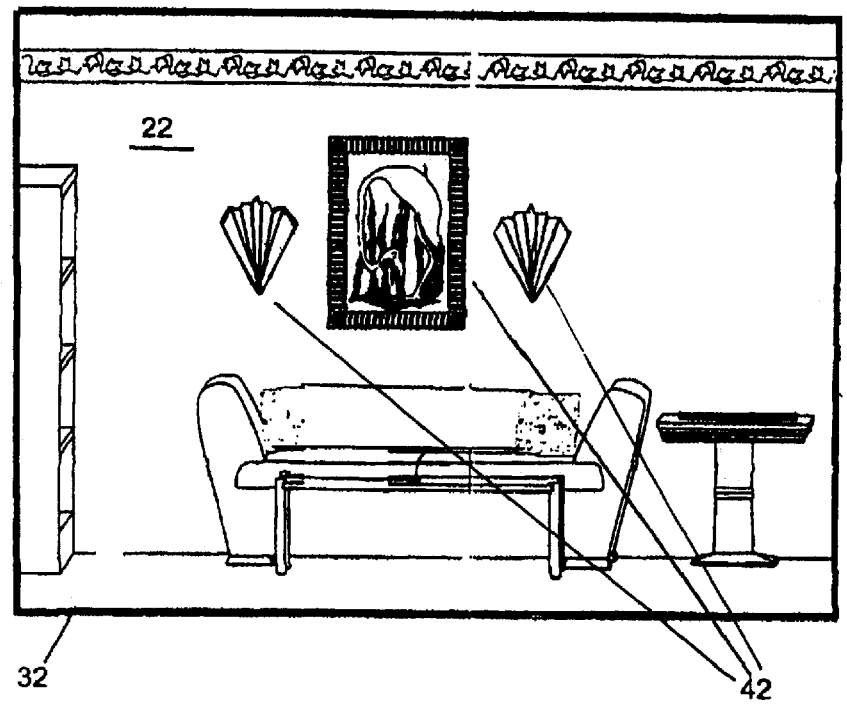

Referring now to FIGS. 7A and 7B, following the capture of the wall area image 32, a user may view one or more artwork images 42 properly sized and overlayed on the wall area image 32 to provide a simulation of the wall area to be decorated along with the selected artwork item. Such a simulated picture enables the user to view a simulated image of the artwork item in the area to be decorated to gain an idea of what the area to be decorated would look like with the artwork item located therein. The user may access a site maintained, for example, by an artwork merchant. The user is able to access this site through a global network system, such as the Internet, through a Wide Area Network (WAN), a Local Area Network (LAN) or even by simply physically transferring the image by a storage media to the merchant's physical location. Further embodiments of the present invention utilize kiosks set up at various locations that enable a user to transfer the wall area image 32 to the kiosk through any available image transfer means, including a network connection or connection to a device having the wall area image 32 stored therein. Images of artwork available through the merchant (FIG. 6) may be viewed against the wall area image 32, as illustrated in FIGS. 7A-7B. The user may select from a library of artwork images 42, as illustrated in FIG. 6. Such a library may be displayed using any suitable method, such as on a monitor or in a catalog. The user selects the desired artwork image 42 that is then overlayed onto the wall area image 32, as illustrated in FIG. 7A. The user is thus able to view a virtual impression of the artwork item mounted on the user's wall against the appropriate environmental influences. The user is able to determine subjectively whether the artwork item is suitable on that wall and in that particular area. For example, the user can determine whether the size of a particular artwork item is suitable on the user's wall, whether the color of the wall clashes with the particular artwork item, whether the color of other objects adjacent the wall complements the artwork item, and other considerations. Furthermore, in other embodiments, a user can also associate frames and/or matting with a particular artwork item. Thus the user is able to view various available artwork items with various matting/framing in a virtual setting in conjunction with the area to be decorated. Furthermore, a user may also associate other artwork items with any particular artwork item, such as when two or more pieces are to be placed on a particular wall, as illustrated in FIG. 7B. In the illustration of FIG. 7B, artwork sconces are placed in proximity of a painting, although it will be understood that two or more artwork images of any type of artwork item may be selected. Similarly as described above, each image of available artwork items may be selected from the library of available artwork images.

Such a system may be utilized in a variety of manners. In one embodiment the system is used in connection with one or more art galleries having a library of artwork images. The wall area image is transmitted to one or more art galleries using any available means, such as by a network connection, discussed in greater detail below, or by way of removable storage media. Once the wall area image is transmitted to a gallery, a user can view artwork images of artwork items available from the gallery in conjunction with the wall area image to view a virtual impression of the artwork item in the wall area to be decorated. The artwork image, as described above, is scaled to provide the artwork image that is in proportion to the wall area to be decorated, such that the virtual impression provides an accurate simulation of the selected artwork item in conjunction with the wall area to be decorated. In many instances, the artwork image may not be directly overlayed onto the wall area image, due to the scaling of the images being different. For example, an artwork item may have dimensions of 24 inches by 36 inches. It is desired that the artwork image, when overlayed onto the wall area image, be sized to provide an accurate simulation of the artwork item mounted on the wall area to be decorated. If an artwork image is not properly scaled to the wall area image, the virtual impression may depict the artwork item as the wrong size in relation to the wall area to be decorated, thus not providing an accurate simulation of the artwork item in conjunction with the wall area to be decorated. The scaling of artwork images and wall area images will be described in more detail below.

Another embodiment enables the user to go to a physical location associated with an art gallery or with another entity having a library of artwork images. For example, a system may be located at an interior design firm, at a shopping mall, at a museum, at a frame shop, or at other locations that may have an association with the art gallery. In one embodiment, the user goes to an art gallery that uses the wall area image in a projection system to enable a near life size wall area image of the wall area to be decorated along with various different artwork images of artwork items that are available through the gallery. Another embodiment of the present invention uses this system over a global or wide area network. This enables the user to view the virtual impression of the artwork image and their wall area image at a time and location convenient for the user. The user may go to a website associated with an art gallery, or in another embodiment, at a "clearinghouse" website that allows the user to view a vast inventory of artwork from a variety of sources. Also, one embodiment uses an "off-the-shelf" software program that includes a library of available artwork and is operable to receive the wall area image of the user's wall area to be decorated and perform scaling of the artwork image to the wall area image to display a simulation of artwork on the wall. The user can thus view any number of available artwork images along with any available options such as associated frames and/or matting, against the user's wall. Once a particular piece of artwork is selected, then the user can purchase the piece by ordering from the program, by placing an order from a source associated with the program, or by physically picking up the piece from an artwork gallery or dealer.

Still another embodiment enables the user to capture a wall area image of one or more wall areas to be decorated, and provide the wall area image(s) to a décor service. The décor service makes the wall area image(s) available to various different providers of artwork items. One or more of the various artwork suppliers may then select one or more artwork items that they believe would work well in the area to be decorated, scale the artwork image(s) and/or wall area image, overlay artwork image(s) of the selected artwork item(s) on the wall area image and provide the simulated image to the user. Thus, a user may receive one or more "proposals" from one or more different artwork providers, and may then select one or more artwork items. Artwork providers may include, for example, an interior design firm, an art gallery, an artwork dealer, and individual artists. In such an embodiment, the user may also provide one or more criteria along with the wall area image(s), such as size, style, color, and/or price.

In yet another embodiment, the user can, instead of using an image of the wall area to be decorated, select the color of paint of the wall from a library of paint colors. There are presently available systems that enable a user to match their paint color from a library of known paints. The different colors are provided with pantone numbers that are commonly available. The user then only needs to provide the appropriate dimensions of the wall and a rendering of the user's wall can be created. Other environmental influences, such as rugs or carpets, lighting, and other objects can also be created in this rendering by selecting such items from a library of items. While such a rendering may not completely depict the room of a user, it may provide an adequate illustration for the user to select artwork, and in particular artwork that is of a desired size for the wall area to be decorated.

It is to be understood that the above descriptive embodiments are provided for purposes of illustration and discussion only. Other embodiments are within the scope of the claimed inventions. For example, other embodiments of the present invention will enable the user to view other artwork images in conjunction with the wall area image, such as furniture, wall coverings, sconces, paint, decorative embellishments, statutes, vases, stencils, faux finishes, and/or other such objects and embellishments affecting the subjective environment. In another embodiment, the user can select various lighting sources to be applied to the virtual impression. For example, direct or indirect natural lighting can be selected, as well as lighting from artificial sources such as incandescent or fluorescent. Also the level and direction of the lighting may be selected.

Another embodiment of the present invention uses three-dimensional viewing of an entire room or area to be decorated in a virtual reality type setting. The user can decorate the entire room or portions of the room in a setting that appears as though the user is actually in the room or area to be decorated. Such a system may be used in a projection type setting in a viewing room associated in a gallery, for example. Other embodiments use pantographic photographs to also view artwork and other embellishments in association with portions of rooms and/or areas to be decorated. Furthermore, an embodiment of the invention provides that a user may change the viewing angle and/or distance of the area to be decorated in order to provide a virtual impression of a particular artwork piece, or pieces, and the wall area to be decorated from various locations from within a room, such as an entrance to a room. In such a manner, a user may view a virtual impression from a perspective of an entrance to the room, and then change the viewing angle and/or level of zoom to view a virtual impression from a closer distance and/or different angle.

Having generally described various aspects of the invention, a specific implementation of an embodiment is discussed below. It is to be expressly understood that this embodiment is provided for descriptive purposes only and is not meant to limit the scope of the claimed inventions. Other physical implementations are available as well under the claimed inventions.

Figure 8:
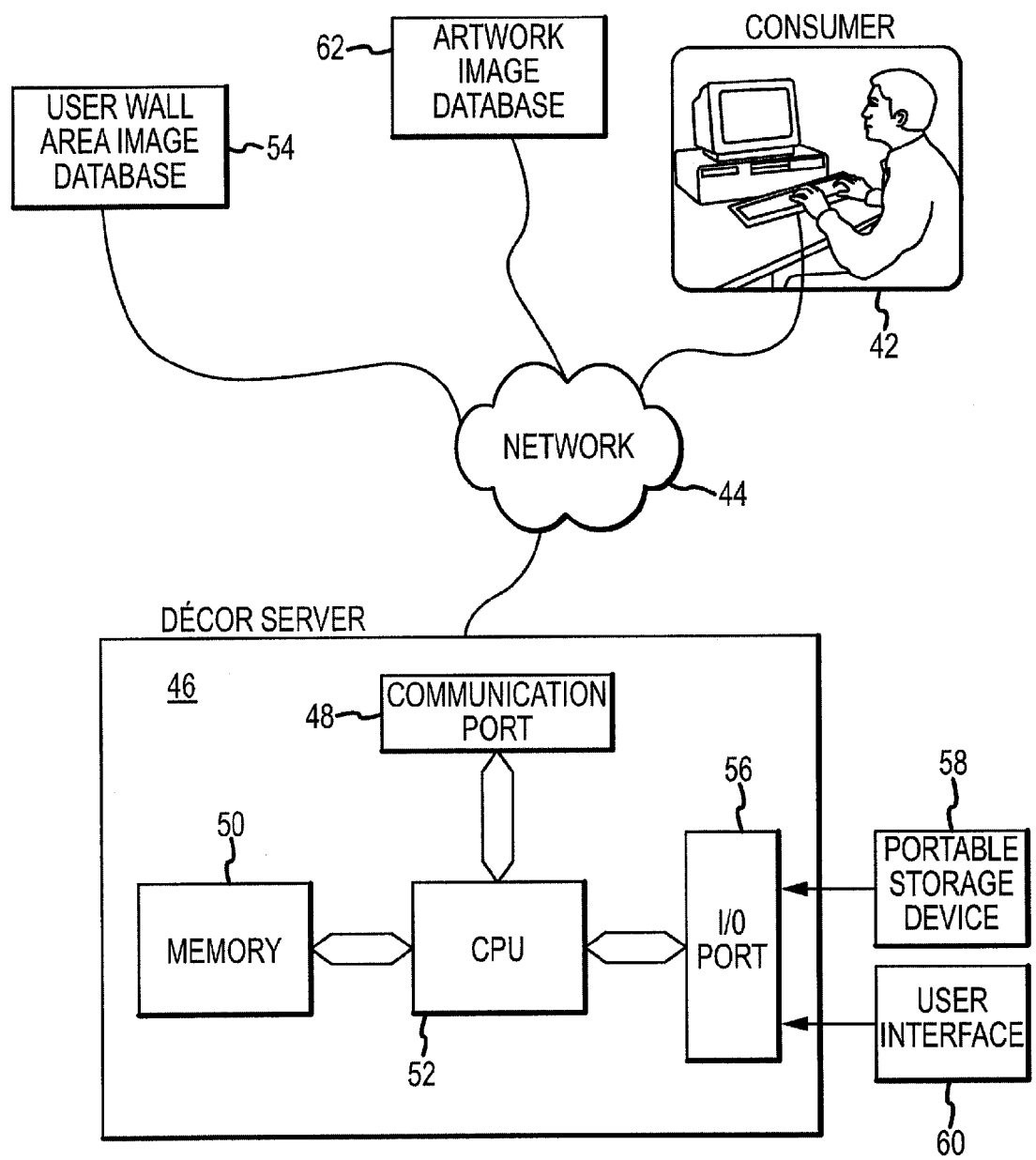
FIG. 8 is an illustration of a networked system of an embodiment of the present invention.

An example of the use of a networked merchant site is illustrated in FIG. 8. A décor server 46 may be maintained by a merchant, or other entity, selling artwork, such as an art dealership. The décor server 46 includes a communication port 48 that effectuates communications between the user 42 and the décor server 46. The user 42 communicates with the server 46 over network 44 by sending data packets encapsulated in a network recognizable protocol, such as Transport Control Protocol (TCP) and Internet Protocol (IP). The network 44 includes typical network equipment, such as routers, bridges, repeaters, and other known networking equipment. The user 42 computer, décor server 46, as well as any other network attached devices, databases, or servers, are identified by a unique domain name or an Internet IP address.

In the embodiment of FIG. 8, the user 42 transfers the wall area image to a server memory unit 50 through the network 44 and communication port 48 that are connected to a central processing unit (CPU) 52. The memory unit 50 may include any type of memory suitable for such storage, including RAM and ROM integrated circuits, magnetic disk and tape drives, optical disk drives, and the like. In one embodiment, the user 42 has an established account with the décor server 46, or such an account may be established when a user accesses the décor server 46. If a user 42 has such an account, one or more wall area images for the user 42 may be stored in a user wall area image database 54 connected with the décor server 46 through the network 44. Although the user wall area image database 54 is illustrated as being separated from the décor server 46 by the network 44, it will be understood that such a database may be integrated within the décor server 46. In the event that the user 42 does not have an account, the user may transmit the wall area image to the décor server 46 over the network 44, with the wall area image temporarily stored in memory 50. The CPU 52 is utilized to move the wall area image from the user wall area image database 54 or the user 42 computer and communication port 48 to the memory 50. In addition to wall area images, the user wall area image database 54 may store additional information, such as a user name, password, and image scale. In table 1, an exemplary set of user database records are shown.

TABLE 1

Example of user wall area image database records

| No. | User Name | Password | Image Location | Scale |
|-----|-----------|----------|----------------|-------|
| ... |           |          |                |       |
| 34  | Bob Smith | Knx492   | BS001.gif      | 0.0086 |
| 35  | Mary Jones| Hjd308   | MJ001.jpg      | 0.0131 |
| ... |           |          |                |       |

Each user wall area image database record is identified by a unique record number field that distinguishes it from other records. The user name field contains the name of the user 42 to which the record belongs. The password field contains a password that is used to authenticate the person trying to access the record information. Typically, the password field is encrypted to maintain its secrecy. The image location field points to a memory location where the wall area image file is stored, such as a file name and/or directory path. The image scale field contains a calculated scaling factor that relates the wall area image size to the actual size of the area to be decorated. The scaling factor is discussed in more detail below. As will also be discussed below, it is contemplated that each user account may include more than one wall area image file, and thus each user wall area image database record may therefore be expanded accordingly to include additional wall area images and may also include a brief description to help identify the wall area to be decorated that is associated with each wall area image, such as "living room" and "office," for example.

Returning to FIG. 8, the décor server 46 also includes an input/output (I/O) port 56 to send and receive data to and from external devices. In a particular embodiment of the present invention, the wall area image file may be delivered to the décor server 46 via a portable storage device 58 that is physically connected to the décor server 46. Such a portable storage device 58 may include any device that is capable of storing the wall area image file and providing the wall area image file to the décor server 46, including, for example, a floppy disk, optical disk, memory card, a portable file storage and playback devices such as an MP3 player, a portable laptop computer, a digital camera, and a digital video recorder, to name but a few. Such portable storage devices 53 may communicate with the décor server 46 through the I/O port 56 using a physical I/O port such as a serial port, a parallel port, and/or a USB port. Portable storage devices 53 may also communicate with the décor server 46 wirelessly through a wireless connection associated with I/O port 56. A portable storage device 53 may be presented to an art gallery in person, such as while the user 42 is vacationing, and a gallery employee can transfer the wall area image file(s) from the portable storage device 58 to the memory unit 50. The décor server 46, in the embodiment of FIG. 8, also includes a user interface 60, that may be used by a user located at the décor server 46. Furthermore, the user interface 60 may be used when a user is vacationing and visiting a particular gallery. Such a user may use the user interface 60 to access a previously stored wall area image located at the user wall area image database 54 over the network 44. In such a case, the user is not required to present a portable storage device that contains a wall area image file, but may still be presented with a virtual impression of various pieces of artwork located in the area to be decorated.

The décor server 46 in this embodiment is also connected to an artwork image database 62 through network 44, and stores various artwork images of available artwork. The memory location of each artwork image, along with properties of the artwork associated with the artwork image is stored and cataloged in artwork image database 62. Although the artwork image database 62 is illustrated as being separated from the décor server 46 by the network 44, it will be understood that such a database may be integrated within the décor server 46. The artwork image database 62 includes artwork images of various different pieces of artwork that are available. In Table 2, exemplary artwork image database records are represented. Each record may contain a unique record number field, a decoration category field, a description field, an image location field, a color scheme field, and an item size field.

TABLE 2

Example of artwork image database records

| No. | Category | Description | Image Location | Color Scheme | Scale (in/pixel) | Actual Size |
|-----|----------|-------------|----------------|--------------|------------------|-------------|
| ... |          |             |                |              |                  |             |
| 92  | Print    | Flamingo Print | PR044.jpg | pink green | 0.141 | h 32 inches<br>w 32 inches |
| 93  | Frame    | Bordeax Frame | FR059.jpg | white purple | 0.098 | h 40 inches<br>w 40 inches |
| 94  | Candle Sconce | Metropolitan Sconce | CS984.jpg | Brushed steel | 0.097 | h 18 inches<br>w 6 inches |
| 95  | Shelving | Maple Linear | S012.jpg | Maple wood | 0.127 | h 2 inches<br>w 36 inches |

The category field in each artwork image database record enables a query to be made according to the category of artwork desired by the user. Additionally, the color scheme field may be used to narrow the query to only that artwork that contain certain desired colors. Similarly, the actual size field bay be used to narrow the query to only artwork of a certain size or range of sizes. Other database fields, such as a price field, décor style field, artist field, location field, genre field, and/or subject field may also be utilized to search for available artwork. The description field holds a brief description of the artwork and it is contemplated that this field may be queried as well. A user may thus enter one or more queries to search for available artwork that meets one or more criteria that the user may have. The image location field points to the location where the artwork image of the associated artwork is stored. Finally, the scale field contains an artwork image scaling factor that relates the artwork image size to the actual size of the artwork pictured, as will be discussed in more detail below.

Figure 9A:
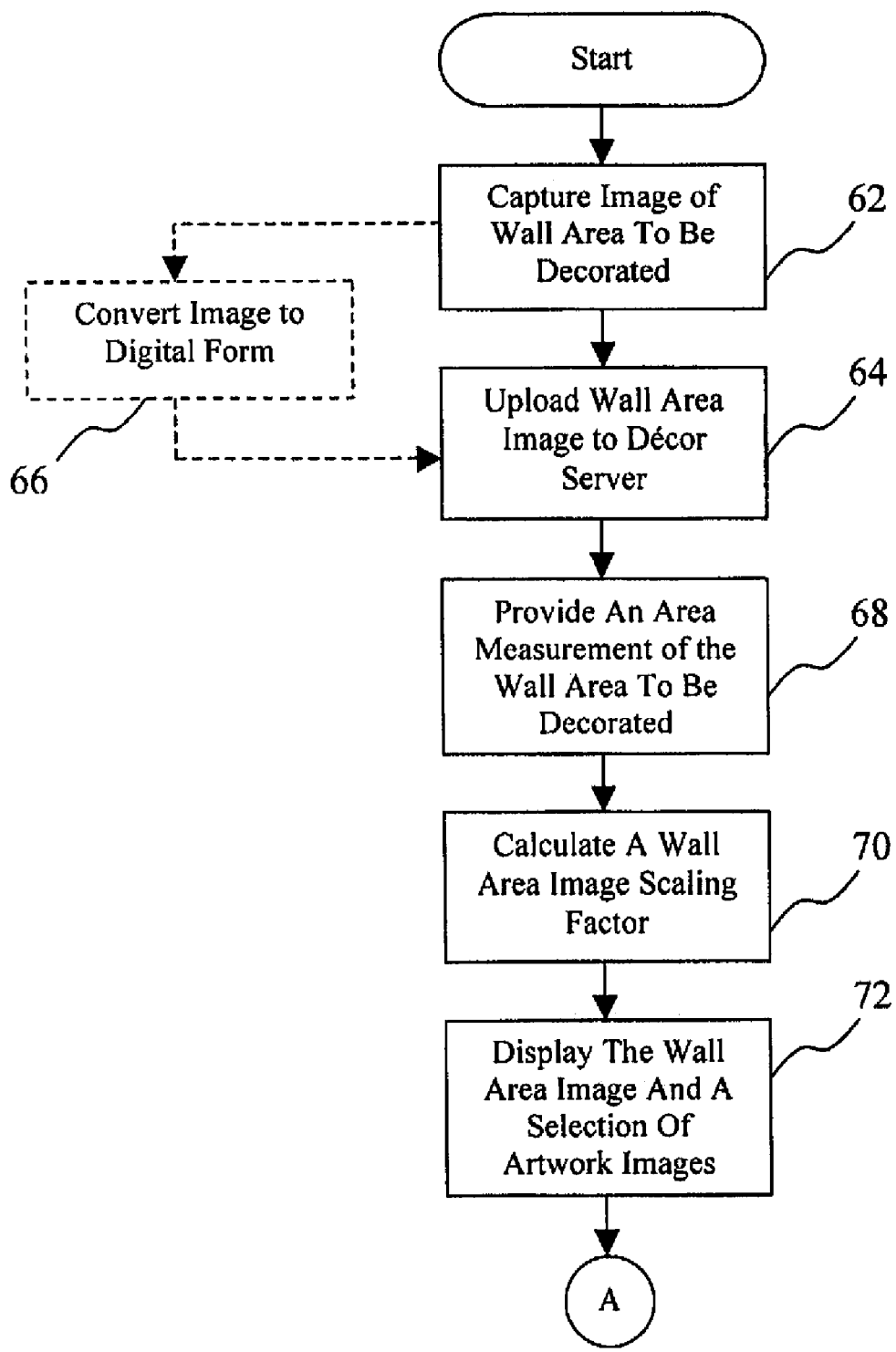
FIGS. 9A and 9B are flow chart illustrations of the operational steps of an embodiment of the present invention.
Figure 9B:
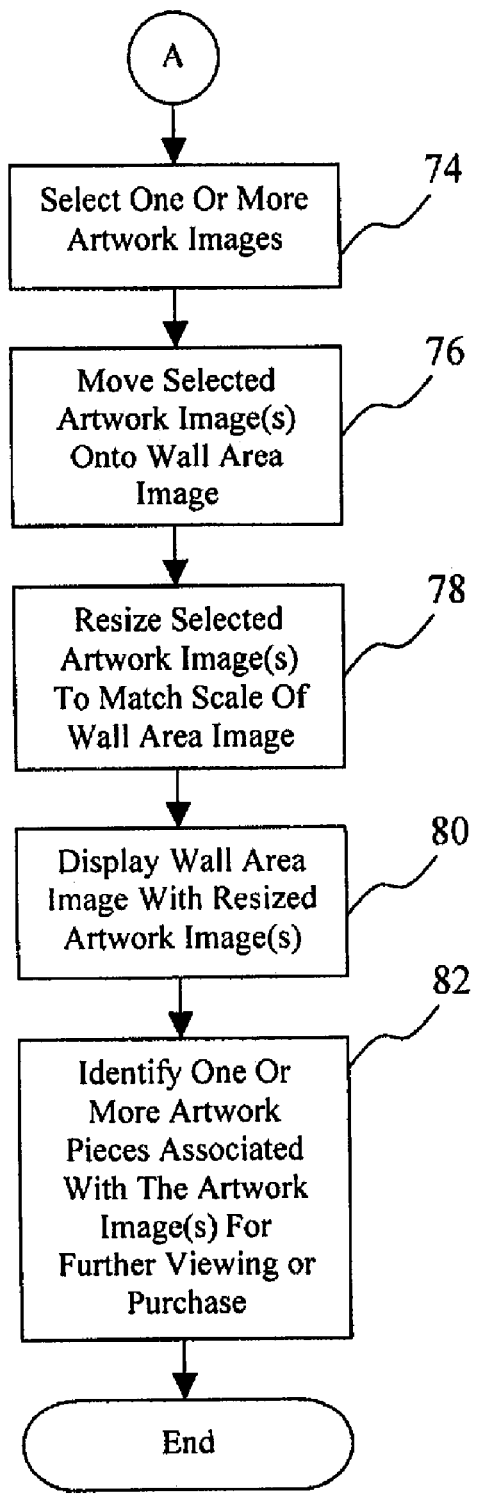

In FIG. 9, a flow chart describing the operations carried out by an embodiment of the present invention is illustrated. Initially, as indicated in FIG. 9A at block 62, an image of the wall area to be decorated is captured. As discussed previously, in one embodiment the wall area image is captured when the plane of the camera (or other image capture device) is substantially parallel to the wall area to be decorated, possibly with portions of adjacent walls, ceiling, and/or floor showing. Next, at block 64, the wall area image is transmitted to the décor server. As discussed above, the wall area image may be transferred to the décor server in numerous different manners, such as over a computer network, a wireless connection, or via a tangible media such as a floppy disk or memory card. In some cases, additional digitizing steps 66 to convert the image of the area to be decorated to a digital wall area image may be required before transferring the wall area image to the server and/or processing the wall area image for color matching, cropping, etc. At block 68, a scaling measurement is provided to the décor server. The scaling measurement provides an area dimension of the area to be decorated, and is used to calculate the wall area image scaling factor, which is used at a later step in this embodiment.

Figure 10:
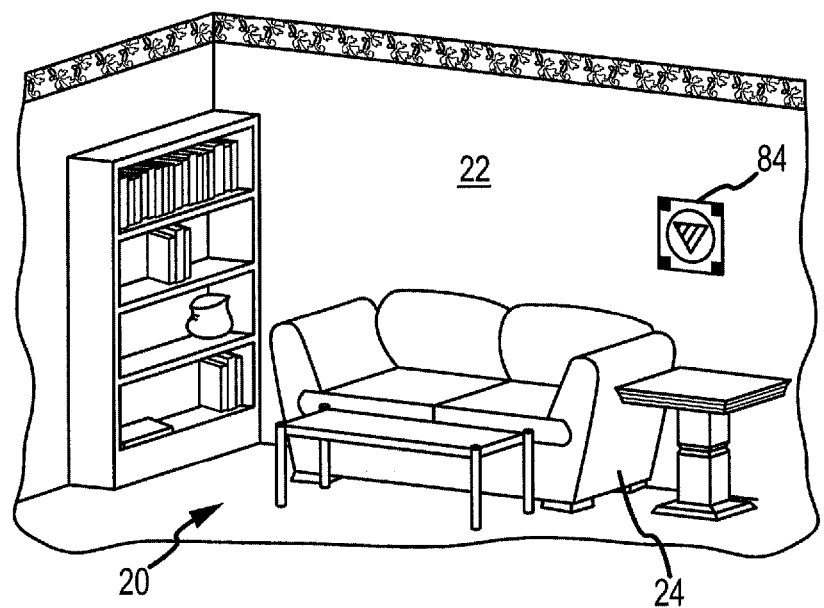
FIG. 10 is an illustration of an area to be decorated and a scale reference mark.

The measurement may be of a portion of the wall area image, and provides an indication of the area dimension of the wall area to be decorated. In one embodiment, a predefined scale reference mark is used to provide the scaling measurement. Such an embodiment is illustrated in FIG. 10. In this example, a user places a scale reference mark 84 having a unique pattern on the wall area to be decorated 22. In the example of FIG. 10, the scale reference mark 84 contains a pattern that may be used by software running at the décor server to easily recognize the reference mark 84, or that may be easily identified by a user and selected using software running at the décor server. Various portions of the pattern of the scale reference mark 84 have known dimensions, and may be used to obtain a scaling measurement that will be used in proper scaling operations for displaying an artwork image on the wall area image, as will be discussed in further detail below. In the example of FIG. 10, the scale reference mark 84 may be printed on a standard letter-sized piece of paper and affixed to the wall area to be decorated 22. Such a scale reference mark 84 may be provided to the user, for example, via an Internet web site, and printed by the user. In such a manner, the merchant or proprietor providing the scale reference mark 84 thus has knowledge of the dimensions of different pattern features of the scale reference mark 84. For example, the scale reference mark 84 may be square and have a known distance of 8 inches between corners along the edges of the square. The corners of the scale reference mark 84, in this example, are identifiable in the pattern and thus the pixels representing the corners in the scale reference mark 84 may be identified in the wall area image. If, for example, there are 80 pixels between the pixels that mark the outer boundary of corners of an edge of the scale reference mark 84, it can be determined that each pixel in the wall area image represents 0.10 square inches of the wall area to be decorated. Such a scale reference mark 84 may have any of a number of different patterns and/or colors, such as a circle or square made up of certain graduated colors, or may be a solid mark that is a single color that can be identified by a user of by imaging software as a scale reference mark. Furthermore, while a patterned scale reference mark 84 is illustrated in FIG. 10, other types of scale reference marks may be used, such as a strip of tape having a known length. In one embodiment, a user is directed to measure a piece of tape of a specified length, and place the tape on the wall area to be decorated prior to capturing the wall area image. In other embodiments, a user may place a reference mark on the wall area to be decorated that is not a standard size, and then provide the actual size of the reference mark along with the wall area image. In further embodiments, two or more scale reference marks may be used. The wall area image scaling measurement is passed to the décor server, along with the unit of measurement.

Returning to FIG. 9A, the wall area image scaling factor is calculated in step 70. The scaling factor describes the relationship between the wall area image dimension and the actual area dimension of the wall area to be decorated. For example, a wall area image may have a scaling factor of 1/100 indicating that the image is 100 times smaller than the actual area to be decorated. Also as discussed above, such a measurement may be done on a pixel basis, with each pixel of the wall area image representing a determined dimension of the wall area to be decorated. Such a measurement may also be done based on the wall area image dimension and area dimension based on a reference mark contained in the wall area image. Next, at block 72, the wall area image is displayed along with a selection of artwork images of available artwork for the user to choose from. Each artwork image has an artwork image scaling factor calculated in a similar manner as described above. For example, a ratio between artwork dimensions and artwork image dimensions may be used to calculate the artwork image scaling factor, such as the height of the artwork and a corresponding height of the artwork image. As mentioned earlier, both the location of the artwork image and the artwork image scaling factor are stored in the artwork image database.

The selection of available artwork presented to the user may be narrowed by various searches. The user may, for example, be interested in a particular size of artwork, that best fits the wall area to be decorated. Further, the user, for example, maybe interested in a particular category of artwork, either by composition, genre, artist, or other limiting factors. It is contemplated that the user can specify that only that artwork that falls in a particular category be displayed. The user may also search for artwork in ways other than by category. For example, the user may specify that the artworks, in addition to a particular category, have a certain color scheme, style, and/or cost. At block 74 in FIG. 9B, the user chooses one or more artwork images from the selection presented. Each artwork may be selected through a pointing device (such as a mouse), which controls a cursor or pointer position on a computer monitor, and the user selects an artwork image, such as by depressing a button associated with the pointing device. At block 76, the user maneuvers the selected artwork image to a location on the wall area image. This may be accomplished by holding down the pointing device button while positioning the cursor at the desired location on the wall area image. Thus, the user "drags-and-drops" the selected artwork image onto the wall area image.

At blocks 78 and 80, the artwork image is copied and resized such that the artwork image scaling factor is substantially equal to the wall area image scaling factor. By doing so, a representation of how the artwork will look in the area to be decorated is achieved. For example, the length l' and the height h' of the resized artwork image may be calculated as:

$$l \times \frac{a}{d} = l' \text{ and } h \times \frac{a}{d} = h'$$

where l and h are the length and height of the artwork image, a is the wall area image scaling factor, and d is the artwork image scaling factor. By way of example, if an artwork image as stored in the artwork image database has a scaling factor of 1/10 actual size, and the wall area image has a scaling factor of 1/100 actual size, the size of the artwork image is reduced by a factor of 10 to provide a resized artwork image. When resizing the artwork image, common techniques may be used for combining, or expanding, pixels within the artwork image to provide a resized artwork image, such as traditional zooming in/out features common in many imaging software applications and well known to those of skill in the art. In other embodiments, the different scaling factors are recorded as an area that each pixel in respective images represents. For example, a wall area image may have a scaling factor that is 0.10 square inches per pixel, and an artwork image may have a scaling factor of 0.05 square inches per pixel. When resizing the artwork image in such an example, pixels in the artwork image must be combined to provide a resized artwork image in which each pixel represents 0.10 square inches. The calculations performed for resizing an artwork image may also include truncation functions as necessary to eliminate fractions when performing operations on a pixel basis. As will be appreciated, similar resizing may be performed when the artwork image has different scaling factors relative to the wall area image, and the above examples are provided for purposes of illustration and discussion only. Additionally, while the above discussion describes resizing of artwork image(s), it will be understood that the wall area image may be resized as well. Furthermore, each of the artwork image(s) and wall area image may be resized to provide resized images having scaling factors that are substantially equal.

Once the artwork image is properly sized and overlayed with the wall area image, the user can change the position of the resized artwork image by dragging-and-dropping the artwork image to a new location relative to the wall area image. Moreover, additional artwork images may be added to the wall area image, allowing the user to compare various artworks together and view the wall area image with a combination of artworks. The artwork images may also be removed from the digital image by dragging-and-dropping a artwork image outside the digital image. For example, if a user has a certain portion of the area to be decorated in mind, the relevant portion may be filled by a single artwork piece, or by two or more artworks. In one embodiment, the user may perform a search of available artwork that specifies two or more sizes of artwork that are desired. In another embodiment, following the search for a particular size of artwork, a user may be provided with additional options that are commonly available for the particular size searched, such as two or more complimentary artwork pieces that when placed together meet the size criteria. In still further embodiments, a user may indicate one or more artwork sizes desired on the wall area image, and various artwork images meeting different size criteria may be provided that the user may then drag-and-drop onto the wall area image. Finally, at block 82, the user has the ability to identify one or more of the selected artworks for further viewing or purchase. Such further viewing may include an in-person visit to a gallery to view the artwork(s), or delivery of the artwork(s) to the location of the area to be decorated so a user may place the artwork(s) in the area to be decorated and make a decision of whether to purchase the artwork(s).

As discussed above, the wall area image may be stored in the server memory and its location is recorded in a user database. It is contemplated that a user must first log into the décor server by entering a matching user name and password before gaining access to his or her record in the user wall area image database. Once the user identification is verified by the décor server, the user may add, delete, or modify information in the record. However, various other systems may be utilized for practicing the present invention. For example, in one embodiment, a user may provide a wall area image containing a scale reference mark to a décor server. The décor server has access to artwork images, either stored locally or remotely to the décor server, that may be searched, and sized and placed within the wall area image. In such a case, the user may not have a record stored within the user wall area image database, but may have an option to obtain such a stored record in order to avoid having to provide the wall area image each time the décor server is accessed.

Figure 11A:
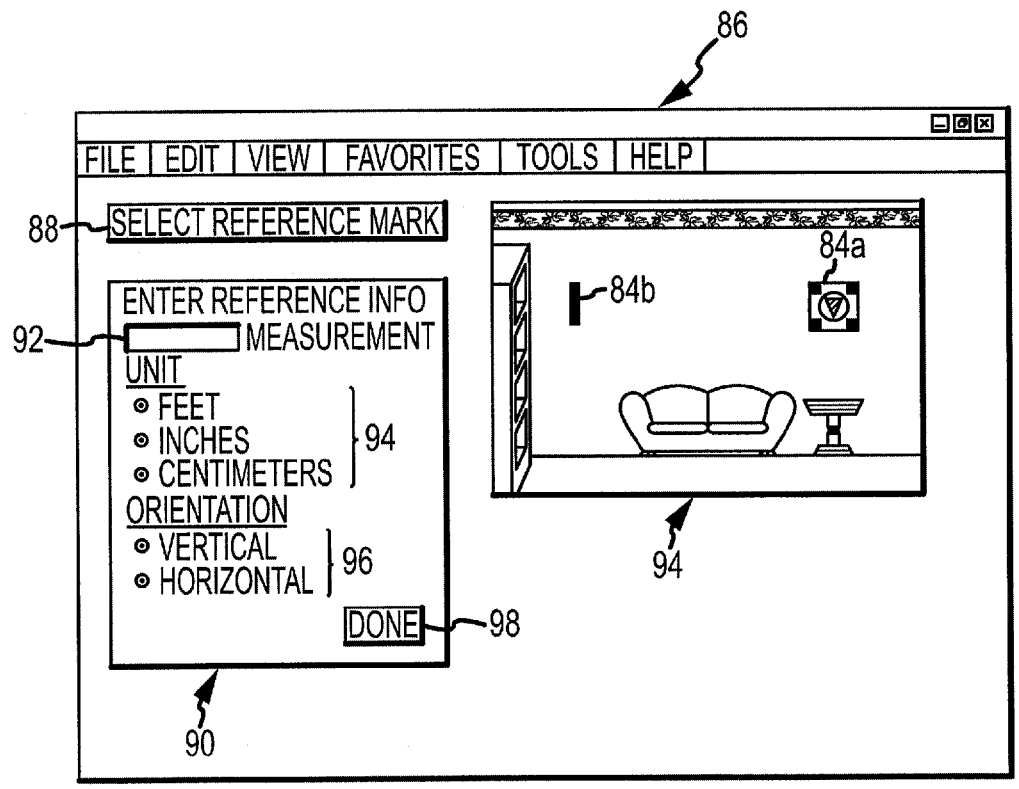
FIGS. 11A-11C are illustrations of a user interface of an embodiment of the invention.
Figure 11B:
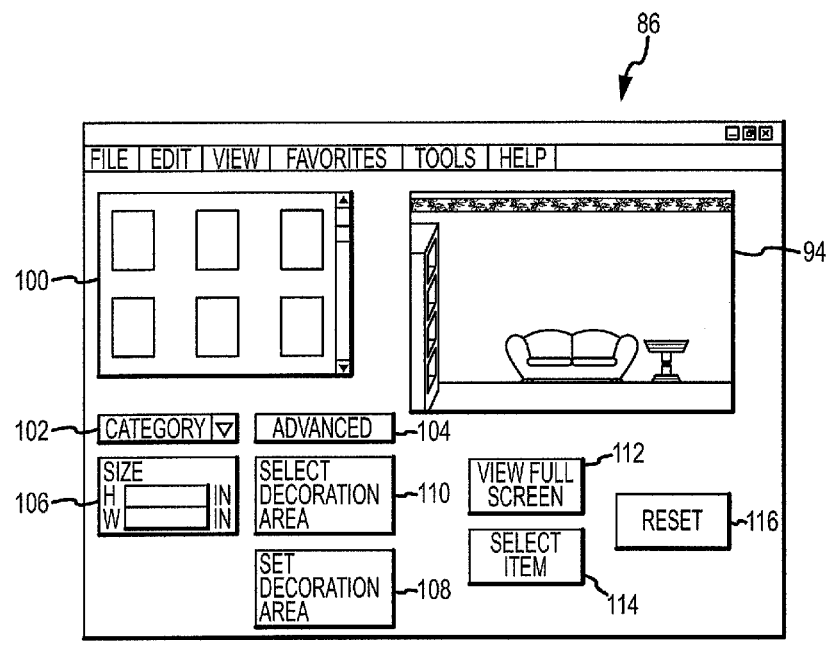
Figure 11C:
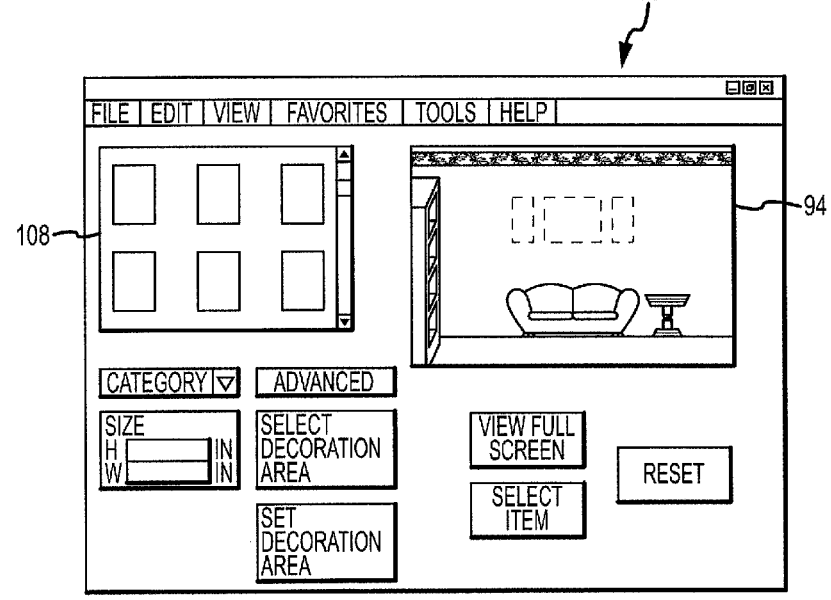

FIGS. 11A-11C show an exemplary user interface 86, such as a web browser, of an embodiment of the present invention. Although the interface 86 is adapted to receive and transmit data over a computer network, alternative stand-alone embodiments of the invention that do not require a network connection may also be utilized. In FIG. 11A, the user interface 86 is configured to receive and display a wall area image 94 and a corresponding wall area image measurement from the user. In one embodiment, a dialog box (not shown) is used to select the wall area image to display. The wall area image of FIG. 11A includes two scale reference marks 84a and 84b. While illustrated having two scale reference marks 84a, 84b, such a wall area image may only contain a single scale reference mark, such as 84a. The scale reference marks 84 are used to obtain the wall area image scaling factor. As discussed above, the wall area image scaling factor may be used to determine the scale of the wall area image 94 relative to the actual size of the wall area to be decorated. The wall area image scaling factor may be determined automatically, in the event that a predefined scale reference mark is identified in the wall area image 94. In the illustration of FIG. 11A, scale reference mark 84a is a predefined scale reference mark. The software operating the user interface 86 may automatically analyze the wall area image 94 for any such predefined scale reference mark 84a, and automatically determine the wall area image scaling factor based on known information regarding the dimensions of the scale reference mark 84a. In other embodiments, the wall area image 94 is displayed on the user interface 86 and a user selects a 'Set Reference Mark' button 88 on the user interface 86. The user may then use a mouse, or other pointing device, to select the scale reference mark 84a or 84b. If the scale reference mark 84 is a predefined scale reference mark 84a, the software operating the user interface then determines the wall area image scaling factor. If the reference mark is not a predefined scale reference mark, such as scale reference mark 84b, the wall area image scaling factor may be determined based on manual input from a user. In a manual entry embodiment, the user first selects a scale reference mark using box 88, selects scale reference mark 84*b* from within the wall area image with a pointing device, and then enters information related to the reference mark 84*b* in manual entry box 90. The user enters the measurement of scale reference mark 84*b* in a measurement input box 92. A set of unit buttons 94 are used to select the units (e.g. English system or metric system) entered in the measurement input box 92. A set of orientation buttons 96 are used to specify whether the distance measured is a horizontal distance (taken parallel the image's horizontal axis), or a vertical distance (taken parallel the image's vertical axis). Following the entry of the appropriate measurement information related to the scale reference mark 84*b*, the user indicates the entry is complete by selecting 'Done' box 98. The software operating the user interface 86 then computes the wall area image scaling factor. The scaling factor may be computed in a number of ways, and in one embodiment, the pixels in the wall area image corresponding to the end points of scale reference mark 84*b* are determined. The distance between the end point pixels, along with the information entered in the manual entry box 90, is used to calculate the wall area image scaling factor. For example, if the distance between the end points of scale reference mark 84*b* is 85 pixels and the value entered in the manual entry box 90 is 8.5 vertical inches, then the wall area image scaling factor may be calculated to be 10 pixels per inch. It should be noted that the units chosen for the scaling factor is not important, as long as the same units are used consistently, or converted as necessary, throughout the invention.

If the orientation buttons 96 indicate a vertically measured distance, then only the difference in y-axis pixel coordinates of the reference mark 84*b* end points is calculated. Likewise, if the radio buttons 96 indicate a horizontal measured distance, then only the difference in x-axis pixel coordinates of the reference mark 84*b* end points is calculated. As discussed above, in one embodiment the wall area image is captured by an image capture device that is substantially parallel to the plane of the wall area to be decorated, and thus the scaling factor in each of the vertical and horizontal directions are set to be equal. In other embodiments, the wall area image may contain pixels that may not have uniform scaling factors across the entire image. Such a situation may occur when the wall area image is not captured with the plane of the imaging device parallel to the wall area to be decorated. In such a case, portions of the wall area image corresponding to an area of the wall area to be decorated that are at a greater distance from the image capture device relative to other portions of the image will have a different scaling factor. Furthermore, the wall area image may be captured using a device having a relatively wide field of view, in which case pixels corresponding to a periphery of the wall area image represent a larger area than pixels from a central portion of the wall area image. In such cases, the wall area image scaling factor includes information relating the different scaling factors for different portions of the wall area image. Once this information is supplied to the software operating the user interface 86, the wall area image scaling factor is calculated and may be stored, for example, the account database (see Table 1).

Following the determination of the wall area image scaling factor, the wall area image 94 is displayed with the scale reference mark(s) 84 masked. The scale reference mark(s) 84 may be masked using any of a number of masking techniques, such as copying colors and/or patterns from the area adjacent to the scale reference mark(s) 84 in the wall area image and placing a copy over the scale reference mark(s) 84. For example, if the wall in the wall area image 94 is green, the green color of the wall is placed over the scale reference mark(s) 84. Thus, the scale reference mark(s) 84 is not visible in the wall area image 94 during later operations, such as illustrated in FIGS. 11B-11C. In FIG. 11B, the user interface 86 is illustrated providing wall area image 94 and an artwork image window 100 in which various artwork images may be displayed. The user interface 86 in this embodiment includes a number of artwork selection boxes 102-110. Included in such boxes is a drop down menu 102 that when selected displays a plurality of categories for various artworks. The decorative categories menu may include, for example, prints, photographs, paintings, shelves, and lamps, to name but a few. One or more artwork categories may be selected, with artwork images corresponding to the selected one or more categories displayed in artwork image window 100. A size box 106 allows the user to select certain sizes of artwork to search, and thus display only artwork images that correspond to the desired size. The user may also select an advanced search option 104, which in one embodiment opens a separate window or dialog box in which more advanced search criteria may be entered. For example, the user may specify that the artwork item have a certain color scheme, style, and/or cost.

In the embodiment illustrated in FIG. 11B, a user may also select a 'set decoration area' button 108. When selected, the user may then use a pointing device, such as a mouse, to designate an area within the wall area image 94 to be decorated. Such an embodiment is illustrated in FIG. 11C, where three decoration areas are set. Such decoration areas may be set, and the actual dimensions of the decoration areas determined using the wall area image scaling factor. One or more of the decoration areas may be selected using the 'Select Decoration Area' box 110. In such an embodiment, a user may select the 'Select Decoration Area' box 110, and then click on one of the previously designated decoration areas. If more than one of the decoration areas is desired to be selected, the user may then click on the additional decoration area(s). In one embodiment, a user may depress a function key on a user interface keyboard (such as the 'Control' key) while selecting additional decoration areas. The artwork image database may then be searched for artwork having a size corresponding to the actual dimensions, and images of the identified artwork displayed in window 100 that a user may then drag and drop into the desired area in the wall area image. The artwork image database, in an embodiment, includes artwork images that are designated as complimentary to other artwork images. In such a manner, if a user selects two or more decoration areas, the database may be searched for artwork images that both meet the size criteria of the decoration areas and are designated as complimentary artwork images to other artwork images that meet the designated size criteria. Furthermore, in another embodiment, the artwork image database provides complimentary artwork images for a single selected decoration area when the size of the combined complimentary artwork images meets the size criteria of the selected decoration area.

The artwork images in the artwork image window 100 are illustrated in FIGS. 11B-11C as thumbnail images that a user may then select, however, it will be understood that other displays of available artwork are available, such as larger images, a listing of available images, etc. The artwork image window 100 may include a scroll bar such that a user may scroll through various artwork images that are provided. When the user finds an item that appeals to the user, the item may be selected by a pointer and then maneuvered to a desired portion in the wall area image 94. Specifically, the user may use a pointing device (e.g. a mouse) to drag-and-drop the artwork image from the artwork image window 100 onto the wall area image 94. Once the position of the artwork image is specified, the artwork image is resized according to the scaling factor associated with the artwork image and the wall area image. For example, the length l and the height h of the resized artwork image may be calculated as:

$$\frac{L \times s}{l'} = l$$

$$\frac{H \times s}{h'} = h$$

where L and W are the actual length and width of the artwork item, s is the scaling factor calculated for the wall area image (stored in the account database for example), and l' and h' are the lengths and width the artwork image. It is contemplated that other artwork images from other decorative categories may be selected and added to the wall area image 94 in a similar manner. For example, in FIG. 11 a painting may be searched, selected, and added to the wall area image, followed by searching of artwork images of shelving that may be selected and added to the wall area image.

When a particular artwork image is selected and placed within the wall area image 94, a user may want to view the combined images on the full screen in order to view more detail. In the embodiment of FIGS. 11B and 11C a user may select a 'View Full Screen' button 112 that causes the user interface 86 to display the wall area image 94 using the full screen of the interface 86. Following the viewing of the wall area image 94 as a full screen image, the user may return to the display of FIG. 11B-C by, for example, simply depressing a mouse button or other specified key or sequence of keys. A user may select one or more items within the display 94 by depressing a 'Select Item' button 114. Such an action may add the artwork image(s) in the display 94 to a shopping cart and give the user the option to review selected items again and possibly eliminate one or more selected items. Remaining selected items may then be identified for further action, such as the arrangement of an in-person viewing of the artwork or purchase of the artwork. A 'Reset' button 116 resets the user interface 86, allowing additional searching and/or decoration areas to be set in the event that the user desires to start over.

In another embodiment, a user may save a wall area image 94 along with overlayed artwork image(s) for viewing at a later time. For example, an art gallery may receive a wall area image from a client with a request to provide artwork that a gallery owner (or employee) believes would fit well with the overall décor of the area to be decorated. In such a case, the gallery owner may overlay several different artwork images onto the wall area image and save the overlayed images. The different options may then be presented for the client to review. Similarly, an interior design firm may save various different options for a client to review when selecting a design for an area to be decorated. In such cases, the overlayed images may be projected on a wall of a viewing room to provide a more life-like simulation for a client to view. Furthermore, in still other embodiments, the area to be decorated is imaged using a pantographic camera, and a client or user may view the area to be decorated, along with different overlayed artwork images, from various different views and angles. In such an embodiment, a gallery or other firm may have a viewing room in which projections of the area to be decorated are projected onto different walls of the viewing room, thus providing a further enhanced simulation for a client to view.

To further aid the user in selecting an artwork item that matches the existing décor in the area, support images may also be imported by the a to the wall area image 94. The support images may be close-ups of patterns or colors in the artwork image, or may include images of décor, furniture, or accent pieces, such as rugs, paintings, or photographs, which the user may further compare with the artwork image(s) selected. It is contemplated that the support images are stored in the account database, along with the user's other recorded information. However, other options are available, such as a library of available support images.

Figure 12:
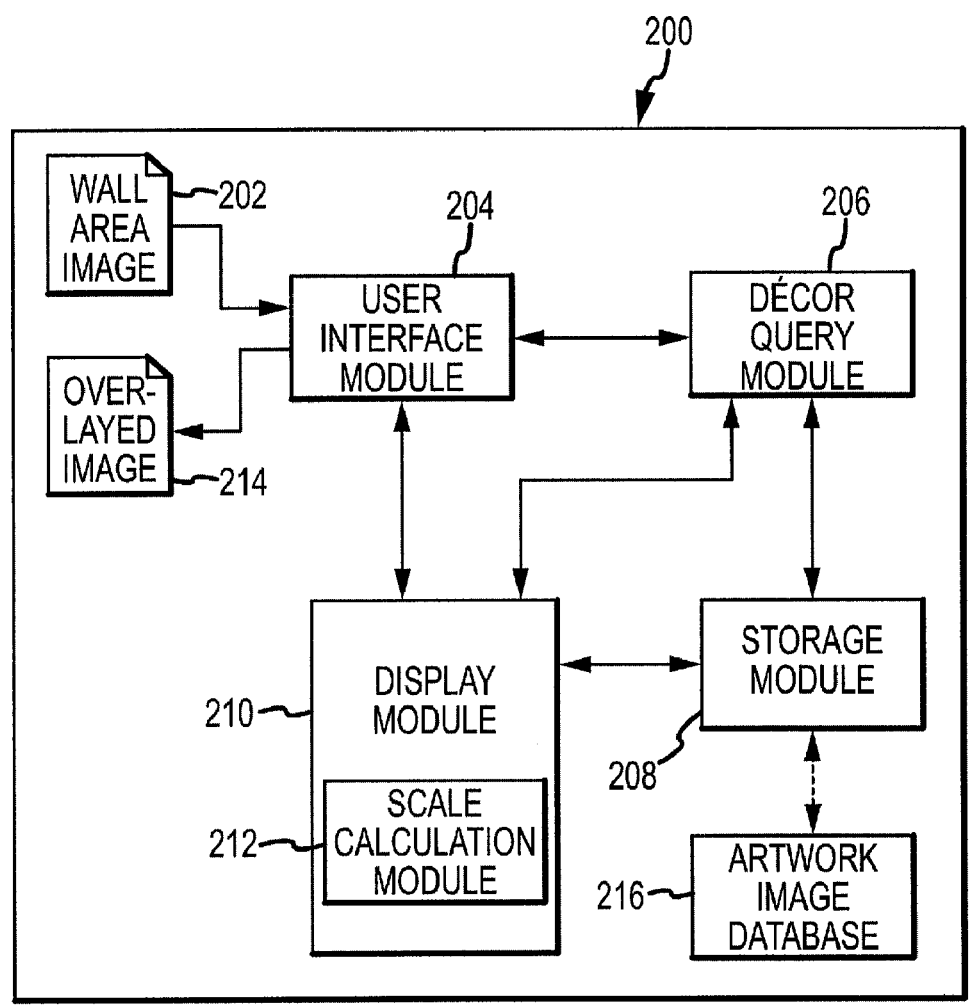
FIG. 12 is an illustration of a system of an embodiment of the invention.

Referring now to FIG. 12, a system 200 embodying an embodiment of the present invention is described. A wall area image 202 is provided to a user interface module 204. Such a user interface module 204 may include any available input/output devices, including network and video connections such as a user interface provided over a wireless or other network connection, for example. The user interface module 204 is also operable to receive search criteria from a user, and provide such search criteria to a décor query module 206. The décor query module 206 receives the search criteria and determines which items in storage module 208 meet the search criteria. A display module 210 is connected to the user interface module 204, décor query module 206, and storage module 208 and is operable to provide a display of the wall area image along with one or more artwork images stored in storage module 208. The display module 210 is operable to scale the wall area image and/or artwork image(s) from the storage module to provide a display that accurately represents the scale of the artwork to the area to be decorated. The display module 210 includes a scale calculation module 212 in this embodiment that performs scaling calculations and enables such a scaled display. The user interface module 204 is operable to receive the display from the decoration display module 210 and provide an overlayed image 214 for viewing by a user. Such an overlayed image 214 includes the wall area image and one or more artwork images that are appropriately scaled to provide the user with an accurate scaled representation of the area to be decorated and the artwork. The user interface module 204, in the event that more then one artwork image satisfies the search criteria, may also provide a display of available artwork images that a user may select to be displayed in relation to the wall area image. The storage module 208, in an embodiment stores artwork images locally, or may be connected to an optional artwork image database 216 that contains artwork images and other information related to the artwork images, such as size, style, category, etc.

Having described various embodiments of the invention, it will be understood that the invention may be implemented in any of a number of ways. For example, a particular establishment, such as an art dealer, a gallery, an interior design firm, and/or other merchant that provides artwork, may provide a service to prospective customers through a website or on systems that are physically associated with the establishment. A user may install software on a personal computer that provides such features, and that may access different establishments through a network connection to obtain artwork images. Furthermore, a web portal may provide such a service, with users signing up for such a service and various establishments providing images.

In addition, it will be appreciated by those skilled in the art that equivalent devices or steps may be substituted for those described, which operate according to principles of the present invention and thus fall within the scope of the claims.

Thus, any equivalent method or device operating according to principles of the invention is considered to fall within the scope thereof.

What is claimed is:

1. A method for providing a simulation of an area to be decorated with at least one artwork item, the area to be decorated having an area dimension, the method comprising:
   receiving a wall area image of the area to be decorated, said wall area image having a wall area image dimension;
   calculating a wall area image scaling factor proportional to the area dimension and to said wall area image dimension, the calculating a wall area image scaling factor comprising:
      identifying a scale reference mark in said wall area image;
      determining a dimension associated with said scale reference mark;
      determining an image dimension of said scale reference mark in said wall area image; and
      calculating said wall area image scaling factor based on said dimension and said image dimension;
   providing a first artwork image of a first artwork item, said first artwork item having a first artwork item dimension and said first artwork image having a first artwork image dimension;
   calculating a first artwork image scaling factor proportional to said first artwork item dimension and said first artwork image dimension;
   resizing at least one of said wall area image and said first artwork image such that said wall area image scaling factor and said first artwork image scaling factor are substantially equal; and
   displaying said first artwork image and said wall area image to provide a combined image simulating said first artwork item in the area to be decorated.

2. The method of claim 1, wherein the resizing operation includes scaling said first artwork image such that said first artwork image scaling factor and said wall area image scaling factor are substantially equal.

3. The method of claim 1, wherein the displaying operation includes placing a scaled first artwork image proximate said wall area image.

4. The method of claim 1, wherein the displaying operation includes overlapping a scaled first artwork image onto said wall area image.

5. The method of claim 1, wherein the displaying operation includes moving a scaled first artwork image within said wall area image.

6. The method of claim 1, further comprising:
   providing a second artwork image of a second artwork item, said second artwork item having a second artwork item dimension and said second artwork image having a second artwork image dimension;
   calculating a second artwork image scaling factor proportional to said second artwork item dimension and said second artwork image dimension;
   resizing at least one of said wall area image, said first artwork image, and said second artwork image such that said wall area image scaling factor, said first artwork image scaling factor, and said second artwork image scaling factor are substantially equal; and
   displaying said first and second artwork images over said wall area image to provide a combined image simulating said first and second artwork items in the area to be decorated.

7. A method for providing a simulation of an area to be decorated with at least one artwork item, the area to be decorated having an area dimension, the method comprising:
   receiving a wall area image of the area to be decorated, said wall area image having a wall area image dimension;
   calculating a wall area image scaling factor proportional to the area dimension and to said wall area image dimension;
   providing a first artwork image of a first artwork item, said first artwork item having a first artwork item dimension and said first artwork image having a first artwork image dimension;
   calculating a first artwork image scaling factor proportional to said first artwork item dimension and said first artwork image dimension;
   resizing at least one of said wall area image and said first artwork image such that said wall area image scaling factor and said first artwork image scaling factor are substantially equal; and
   displaying said first artwork image and said wall area image to provide a combined image simulating said first artwork item in the area to be decorate,
   wherein the providing a first artwork image operation comprises:
      providing a plurality of artwork images of artwork items, said artwork images each having an artwork item dimension and an artwork image dimension; and
      receiving a selection of said first artwork image from said plurality of artwork images; and
      providing said first artwork image.

8. The method of claim 7, wherein the providing a plurality of artwork images operation comprises:
   receiving a search request identifying one or more search criteria;
   applying said search criteria to a set of artwork images to identify a subset of artwork images that meet said search criteria; and
   providing said subset of artwork images.

9. The method of claim 8, wherein said search criteria include at least one of an artwork dimension, an artwork color, an artwork decorative category, and an artwork cost.

10. A method for transporting an image of an artwork object in an area to be decorated towards an interested entity, comprising:
   conveying, over a portion of a computer network, an image that includes a plurality of pixels, a first subset of said plurality of pixels corresponding to an artwork image and a second subset of said plurality of pixels corresponding to a wall area image of the area to be decorated, wherein said first subset of pixels are determined based on said artwork image and a scaling factor of said artwork image relative to a scale reference mark included in said wall area image.

11. The method for transporting an image, as claimed in claim 10, wherein said first subset of pixels comprises pixels corresponding to two or more artwork images.

12. The method for transporting an image, as claimed in claim 10, wherein said first subset of pixels replace pixels of said wall area image in a location corresponding to a potential location of a piece of artwork within the area that is to be decorated.

13. The method for transporting an image, as claimed in claim 10, wherein each of said first subset of pixels correspond to an area of an artwork image that is different than the area represented by each of the pixels in a digital image of the artwork that said artwork image is derived from.

14. The method for transporting an image, as claimed in claim 10, wherein each of said second subset of pixels correspond to an area of said area to be decorated that is different than the area represented by each of the pixels in a previously provided wall area image of the area to be decorated.

15. A computer readable medium having instructions encoded thereon that, when executed by a computing device, cause the computing device to perform operations comprising:
   accessing a wall area image of an area to be decorated, said wall area image having a wall area image scaling factor based on a dimension of said area to be decorated;
   accessing an artwork image of an artwork item, said artwork image having an artwork image scaling factor based on a dimension of said artwork item;
   resizing at least one of said wall area image and said artwork image such that said wall area image scaling factor and said artwork image scaling factor are substantially equal; and
   displaying said artwork image and said wall area image to provide a combined image simulating said artwork item in said area to be decorated, wherein said wall area image scaling factor is based on a reference mark contained in said wall area image.

16. The computer readable medium, as claimed in claim 15, wherein said operations of resizing comprise:
   resizing said artwork image such that said artwork image scaling factor and said wall area image scaling factor are substantially equal.

17. The computer readable medium, as claimed in claim 15, further comprising:
   accessing a second artwork image of a second artwork item, said second artwork image having a second artwork image scaling factor based on a dimension of said second artwork item;
   resizing said second artwork image such that said second artwork image scaling factor and said wall area image scaling factor are substantially equal; and
   displaying said artwork image, said second artwork image, and said wall area image to provide a combined image simulating said artwork item and said second artwork item in said area to be decorated.

* * * * *